(12) United States Patent
Chen et al.

(10) Patent No.: US 8,502,413 B2
(45) Date of Patent: Aug. 6, 2013

(54) COMPOSITE POWER SUPPLY

(75) Inventors: Chang-Hsing Chen, Taipei (TW);
Sheng-Wei Chen, Taipei (TW)

(73) Assignee: Solytech Enterprise Corporation, Taipei (TW)

( * ) Notice: Subject to any disclaimer, the term of this patent is extended or adjusted under 35 U.S.C. 154(b) by 408 days.

(21) Appl. No.: 12/831,507

(22) Filed: Jul. 7, 2010

(65) Prior Publication Data
US 2011/0291477 A1     Dec. 1, 2011

(30) Foreign Application Priority Data

May 28, 2010   (TW) .............................. 99210139 U

(51) Int. Cl.
*H02J 3/14*     (2006.01)
(52) U.S. Cl.
USPC .............................................. 307/31; 307/32
(58) Field of Classification Search
USPC ................................................ 307/31, 32, 44
See application file for complete search history.

(56) References Cited

U.S. PATENT DOCUMENTS

| | | | |
|---|---|---|---|
| 6,125,455 A * | 9/2000 | Yeo | 714/14 |
| 7,320,077 B2 * | 1/2008 | Kim | 713/300 |
| 2001/0023141 A1 * | 9/2001 | Chang | 439/76.1 |
| 2002/0026548 A1 * | 2/2002 | Frank | 710/100 |
| 2002/0091828 A1 * | 7/2002 | Kitamura et al. | 709/226 |
| 2003/0008563 A1 * | 1/2003 | Nishio et al. | 439/625 |
| 2006/0104099 A1 * | 5/2006 | Tsai | 363/144 |
| 2007/0085516 A1 * | 4/2007 | Fenwick et al. | 323/234 |
| 2008/0094210 A1 * | 4/2008 | Paradiso et al. | 340/540 |
| 2008/0133815 A1 * | 6/2008 | Mori | 710/313 |
| 2008/0143290 A1 * | 6/2008 | Chavakula | 320/101 |
| 2009/0063877 A1 * | 3/2009 | Lewis et al. | 713/310 |
| 2009/0157907 A1 * | 6/2009 | Chapman | 710/8 |
| 2009/0260777 A1 * | 10/2009 | Attlesey | 165/67 |
| 2010/0309188 A1 * | 12/2010 | Hying et al. | 345/211 |
| 2011/0161530 A1 * | 6/2011 | Pietri et al. | 710/14 |

* cited by examiner

*Primary Examiner* — Danny Nguyen
(74) *Attorney, Agent, or Firm* — Rosenberg, Klein & Lee

(57) ABSTRACT

A composite power supply includes a plurality of power cluster lines, at least one USB port and at least one DC port formed on a surface of a casing, and the power cluster lines, the USB port and the DC port are electrically connected to a circuit board and the circuit board includes a plug-and-play circuit electrically connected to the USB port and provided for an electronic device to access electric power through the USB port, so as to waive the inconvenience of booting a computer before using the electric power, and the circuit board includes a DC-DC conversion circuit electrically connected to the DC port, and a knob or a multi-stage switch in the DC-DC conversion circuit is provided for adjusting the output voltage of the power ports to improve the convenience of the application significantly.

1 Claim, 7 Drawing Sheets

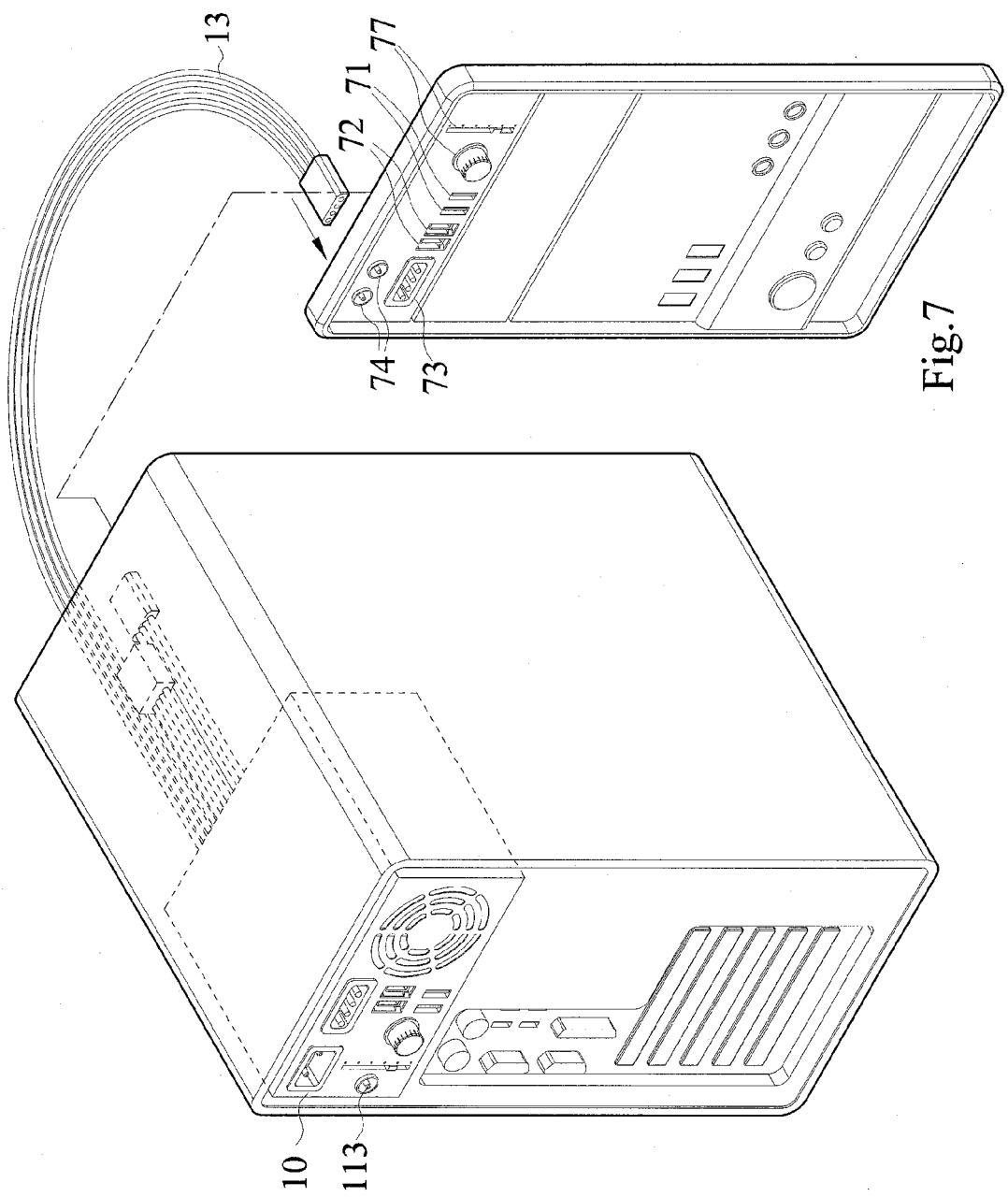

COMPOSITE POWER SUPPLY

BACKGROUND OF THE INVENTION

1. Field of the Invention

The present invention generally relates to the technical field of a conversion device of an electric power system using AC and DC power, and more particularly to a composite power supply having a variety of electric power ports, and capable of supplying electric power without requiring a power-on and capable of adjusting an output voltage.

2. Description of the Related Art

In general, a computer usually comes with a power supply for converting an external inputted 110V AC or 220V AC power into 12V DC or 5V DC or 3.3V DC power required by a motherboard, a CPU interface card, and various internal data access units (such as a hard disk, an optical disk drive or a card reader). As various portable electronic products such as mobile communication devices, notebook computers (NB), personal digital assistants (PDA) and multimedia players (MP4 or MP3 players) become increasingly popular and capable of satisfying user requirements for mobile communications, personal data management, data storage, and multimedia function, the portable electronic products of this type generally have a built-in power supply device provided for charging the portable electronic products repeatedly. After the electric power of a portable electronic product is exhausted, an electric charger can be used for charging the electronic product directly, or various transmission lines or electric power lines can be connected to respective ports (such as the USB port and SATA port) of a computer.

However, various portable electronic products come with electric chargers of various different specifications, and thus it is necessary for users to carry all these electric chargers. Obviously, it is extremely inconvenient to users and definitely an unnecessary waste. Furthermore, a general power supply of a computer cannot be used for supplying power to the portable electronic products or charging the portable electronic products directly, and it is necessary to turn on the computer first, and then use the USB port or SATA port provided on the motherboard to supply electric power to the portable electronic products or charging the portable electronic products in an inconvenient manner.

In view of the foregoing drawbacks of the conventional power supply, the present invention provides a composite power supply structure that provides various power output ports with different specifications to facilitate the connection of various portable electronic products such as a mobile communication device, a notebook (NB), a personal digital assistant (PDA) and a multimedia player. The present invention also has an adjusting structure of a variable output voltage, such that the requirements for supplying electric power and charging various portable electronic products can be satisfied without requiring a power-on.

SUMMARY OF THE INVENTION

Therefore, it is a primary objective of the invention to overcome the aforementioned shortcomings and deficiencies of the prior art by providing a composite power supply structure with various different power output ports to fit various different portable electronic products and improve the convenience of use significantly.

Another objective of the present invention is to provide a composite power supply having an adjusting structure with a variable output voltage to fit various different portable electronic products and improve the adjustment and the convenience of use significantly.

A further objective of the present invention is to provide a composite power supply structure capable of supplying electric power or charging an electronic device without requiring a power-on, so as to improve the convenience of the application.

To achieve the aforementioned objective, the present invention provides a composite power supply, comprising: a casing, including an electric socket, at least one USB port, at least one DC port and at least one through hole, wherein the electric socket is provided for electrically connecting an external electric power source; a circuit board, installed in the casing, and having a power supply circuit, a plug-and-play circuit and a DC-DC conversion circuit installed on the circuit board, wherein the power supply circuit is electrically connected to the electric socket, the plug-and-play circuit and the DC-DC conversion circuit, and the DC-DC conversion circuit is electrically connected to the DC port, and the DC-DC conversion circuit includes an adjusting structure provided for adjusting an output voltage of the DC port; and at least one power cluster line, installed on the circuit board, and electrically connected to the power supply circuit, and passed out from a through hole of the casing. The adjusting structure is selectively a knob or a multi-stage switch installed onto the casing. The casing includes at least one USB port, and the USB port is electrically connected to the plug-and-play circuit. The casing further includes at least one SATA port, and the SATA port is electrically connected to the plug-and-play circuit. The casing further includes at least one USB port and at least one SATA port, and the USB port and the SATA port are separately and electrically connected to the plug-and-play circuit. The casing further includes at least one ATA port, and the ATA port is electrically connected to the power supply circuit.

When use, various different portable electronic products are connected to the USB port, DC port, SATA port or ATA port formed on the casing through the electric power signal lines for supplying electric power or charging various portable electronic products, and a voltage outputted from the DC port can be adjusted quickly through the adjusting structure. Both adjustment and application can be very convenient. After the plug-and-play circuit of the present invention is connected to the external electric power supply, it is not necessary to boot a computer to access the electric power from the USB ports or SATA ports, so as to improve the convenience and practical application significantly.

In a preferred embodiment of the invention, the composite power supply further comprises an external expansion box, and the expansion box includes at least one USB port, at least one SATA port, at least one DC port and a control circuit board installed on a surface of the expansion box, and the USB port, the SATA port and the DC port are separately and electrically connected to the control circuit board, such that the control circuit board is electrically connected to the power supply circuit. The expansion box further includes an adjusting structure, and the adjusting structure is selectively a knob or a multi-stage switch installed onto a surface of the expansion box. The expansion box further includes at least one ATA port, and the ATA port is electrically connected to the control circuit board. The DC port of the expansion box is electrically connected to the DC port of the power supply circuit through an electric power line.

Since the external expansion box is electrically connected to the composite power supply through an external electric power line, therefore the external expansion box can be installed at any position outside the composite power supply theoretically for directly supplying or charging electric power from various electric ports of the expansion box to provide a more convenient operating mode. In addition, adjusting structure disposed on the expansion box allows users to adjust the output voltage anytime, so as to improve the convenience of making adjustments.

In another preferred embodiment of the invention, the composite power supply further includes an expansion panel, and the expansion panel includes at least one USB port, at least one SATA port, at least one DC port and a control circuit board, and the USB port, the SATA port and the DC port are separately and electrically connected to the control circuit board, such that the control circuit board is electrically connected to the power supply circuit. The composite power supply further includes an adjusting structure, and the adjusting structure is selectively a knob or a multi-stage switch installed onto the expansion panel. The expansion panel further includes at least one ATA port, and the ATA port is electrically connected to the control circuit board.

Therefore, the expansion panel and the composite power supply are electrically connected to each other through an internal power cluster line, and the expansion panel is combined with a front panel of a general computer system, and provided for connecting various portable electronic products to various electric ports on the expansion panel for supplying or charging electric power directly, and the adjusting structure is provided for adjusting the output voltage, and thus the invention can improve the convenience of the application and adjustment significantly.

BRIEF DESCRIPTION OF THE DRAWINGS

FIG. 7 is a schematic view of an application status in accordance with a third preferred embodiment of the present invention.

DETAILED DESCRIPTION OF THE PREFERRED EMBODIMENTS

The technical characteristics of the present invention will become apparent with the detailed description of preferred embodiments and the illustration of related drawings as follows.

First Preferred Embodiment

Figure 1:
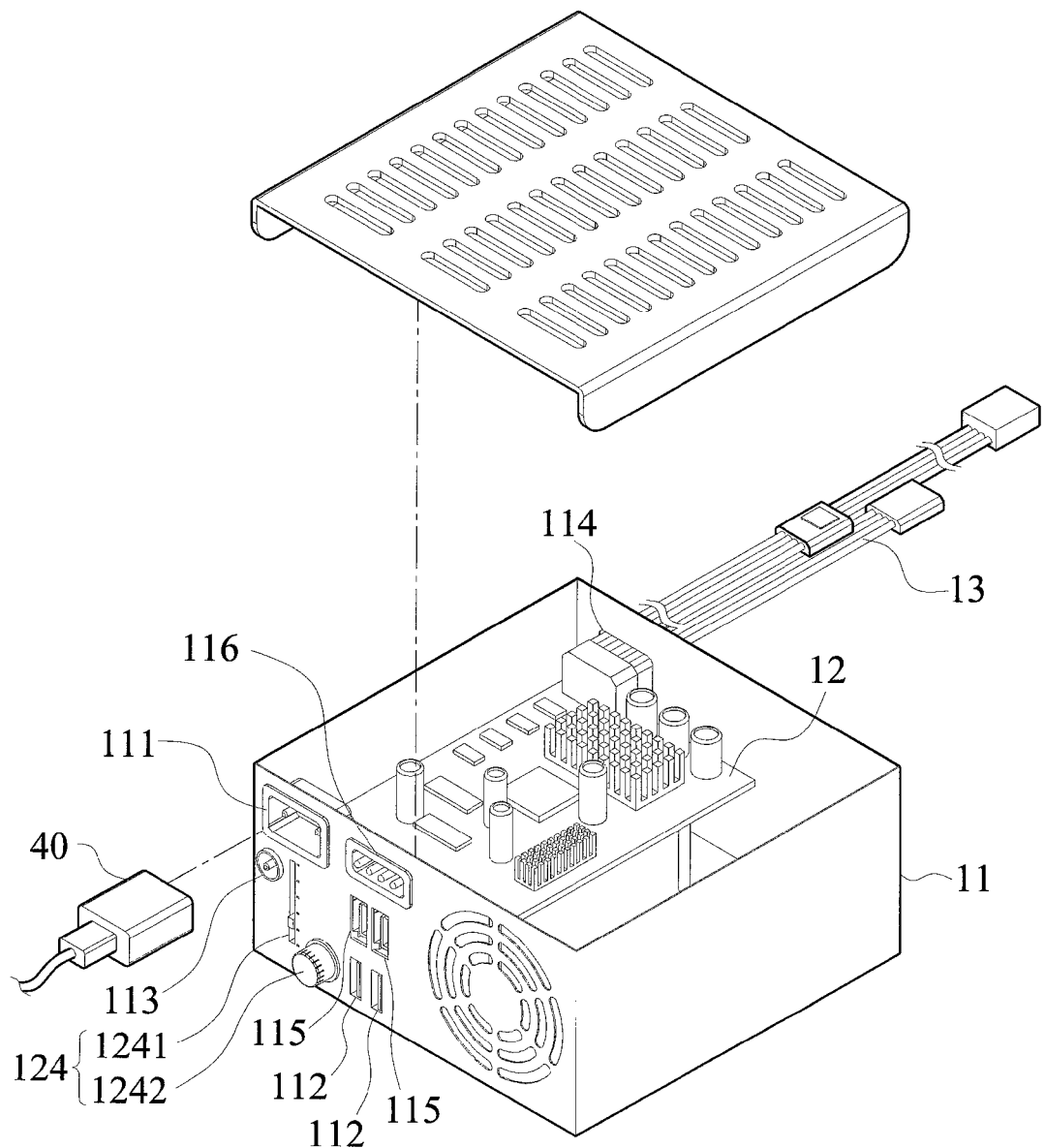
FIG. 1 is a schematic perspective view of a first preferred embodiment of the present invention.
Figure 2:
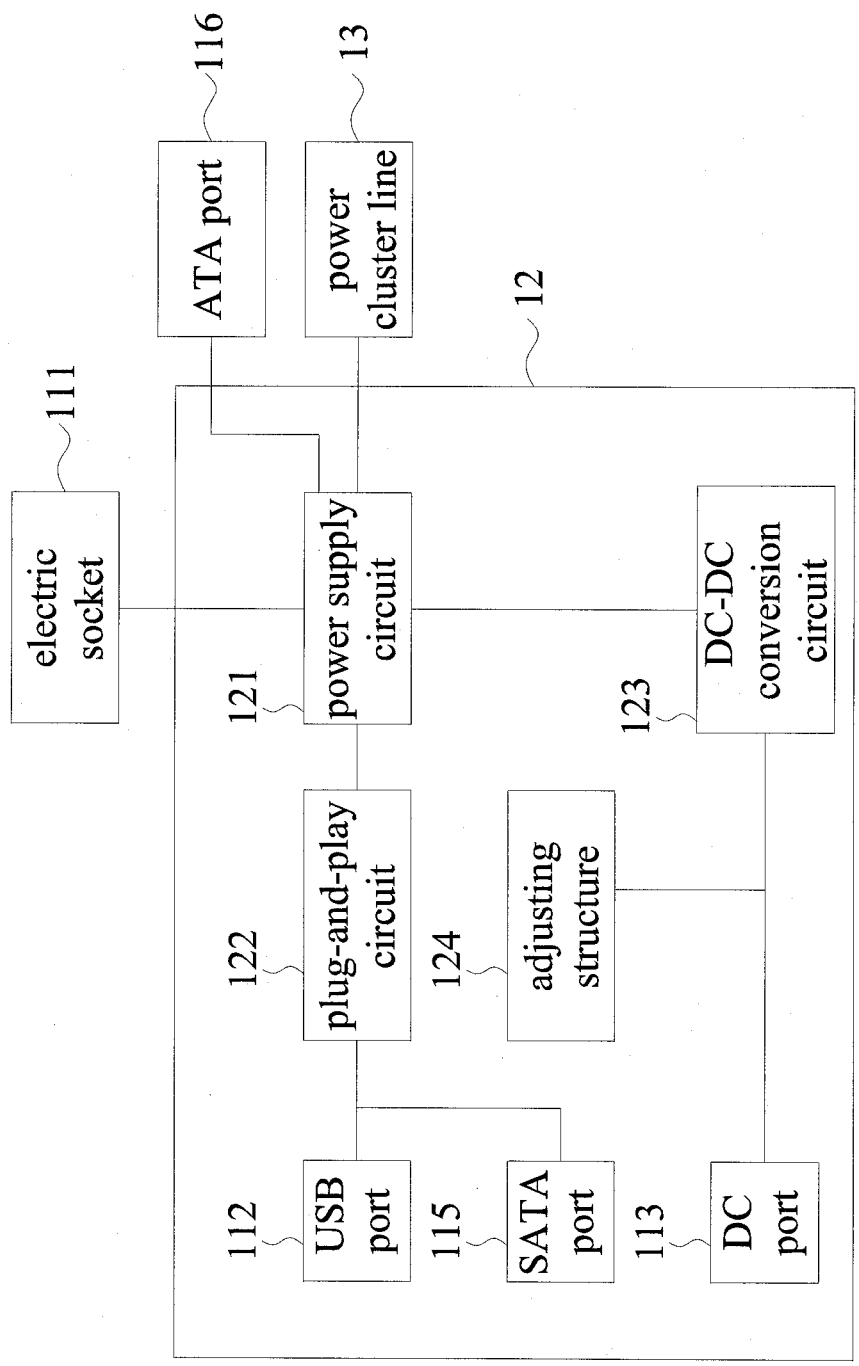
FIG. 2 is a block diagram of hardware of a first preferred embodiment of the present invention.
Figure 3:
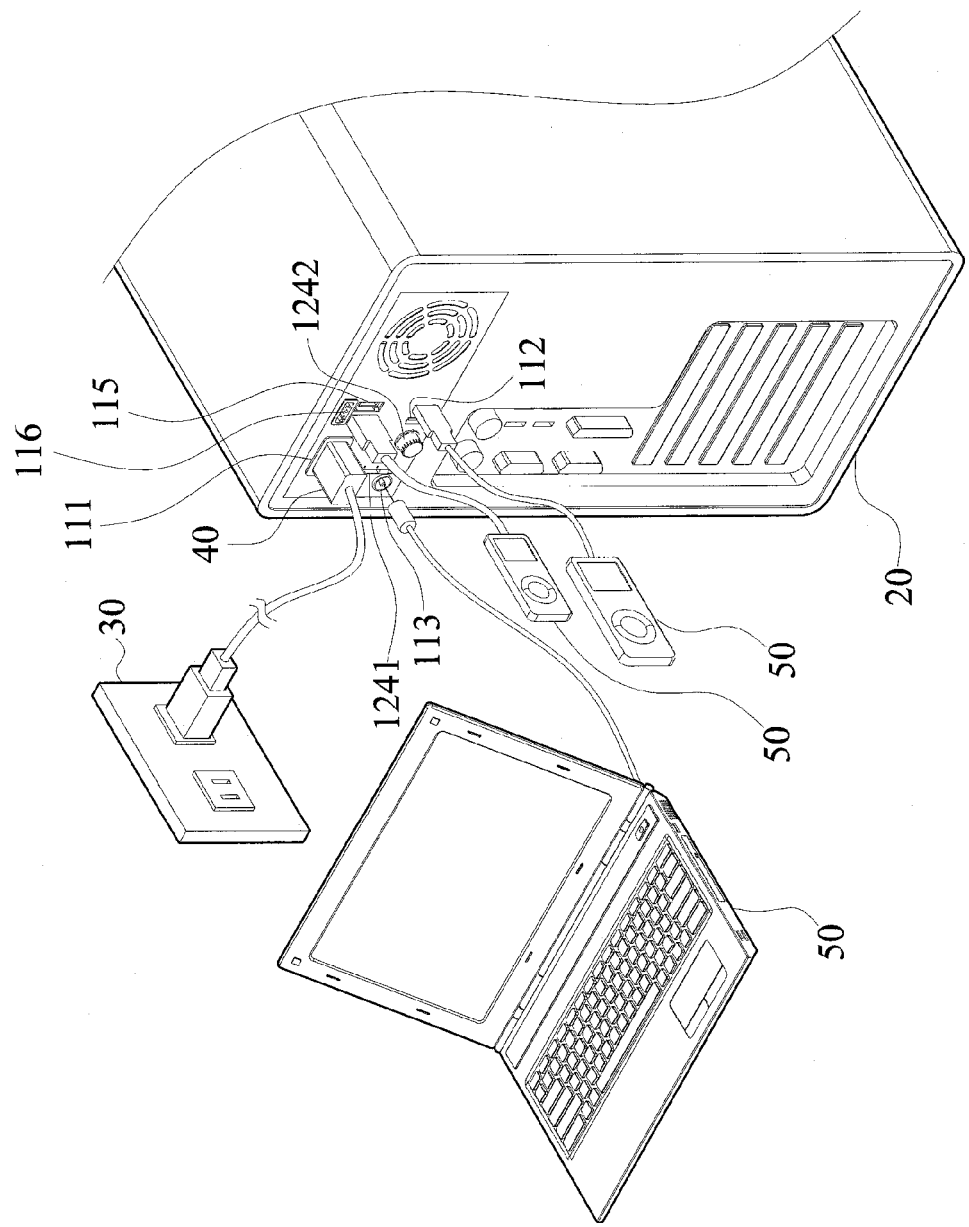
FIG. 3 is a schematic view of an application status in accordance with a first preferred embodiment of the present invention.

With reference to FIGS. 1 to 3 for a schematic perspective view, a hardware block diagram, and a schematic view of an application status in accordance with a first preferred embodiment of the present invention respectively, a composite power supply 10 is installed in a casing 20 of a computer, and electrically connected to an electric power source 30. The composite power supply 10 comprises a casing 11, a circuit board 12 and a plurality of power cluster lines 13.

The casing 11 includes an electric socket 111, a plurality of USB ports 112, a pair of DC ports 113 and a pair of SATA ports 115, formed on a surface of the casing 11, and a through hole 114 formed on another surface of the casing 11, and the electric socket 111 is electrically connected to the electric power source 30 through an electric power line 40.

The circuit board 12 is installed in the casing 11, and the circuit board 12 further includes a power supply circuit 121, a plug-and-play circuit 122 and a DC-DC conversion circuit 123, and the power supply circuit 121 is separately and electrically connected to the electric socket 111, the plug-and-play circuit 122 and the DC-DC conversion circuit 123, the plug-and-play circuit 122 is electrically connected to the USB ports 112 and the SATA ports, and the DC-DC conversion circuit 123 electrically connected to the DC port 113. The DC-DC conversion circuit 123 has an adjusting structure 124 provided for adjusting the output voltage of the DC port 113, and the adjusting structure 124 is generally a multi-stage switch 1241 installed onto the casing 11, or a knob 1242 installed onto the casing 11 for facilitating users to turn the knob 1242 or flip the switch 1241 to adjust the output voltage of the DC port 113, wherein the multi-stage switch 1241 can be a multi-stage slide switch, multi-stage switch 1241 as shown in the figure, or a multi-stage press switch (not shown in the figure) comprised of a plurality of independent press keys. The casing 11 further includes an ATA port 116 (which can be a D-type 4-pin port), and the ATA port 116 is electrically connected to the power supply circuit 121. Therefore, the USB ports, the SATA ports, the DC port and the ATA port can be used for meeting the requirements of supplying or charging electric power for various different portable electronic products 50.

The power cluster lines 13 are installed on the circuit board 12, and the power cluster lines 13 are electrically connected to the power supply circuit 121, and passed out from a through hole 114 of the casing 11, for connecting different devices such as a floppy disk drive, an optical disk drive and a hard disk installed in the computer, and the power supply circuit 121 will supply electric power required for the operation.

During installation, the composite power supply 10 is installed at the rear of the casing 20 for connecting the USB ports 112, the DC port 113, the SATA ports 115 or the ATA port 116 on the casing 11 of various different portable electronic products 50 through various USB cables, SATA cables, DC cables or ATA cables respectively for supplying or charging electric power. Since the DC port 113 is provided for supplying or changing electric power for the portable electronic product 50, it will require voltages of 12V, 16V, 19V, 20V or 24V, and thus the present invention can adjust the output voltage of the DC port 113 quickly by the adjusting structure 124 of the casing 11. After the plug-and-play circuit 122 of the circuit board 12 is connected to the external electric power source 30, electric power can be supplied directly to the USB ports 112 and the SATA ports 115 without powering on the computer, and electric power can be accessed from the USB ports 112 and the SATA ports 115. It is noteworthy to point out that the DC port 113 or the ATA port 116 can be electrically connected to the plug-and-play circuit 122 without requiring a power-on, which is a very convenient application to users.

Second Preferred Embodiment

Figure 4:
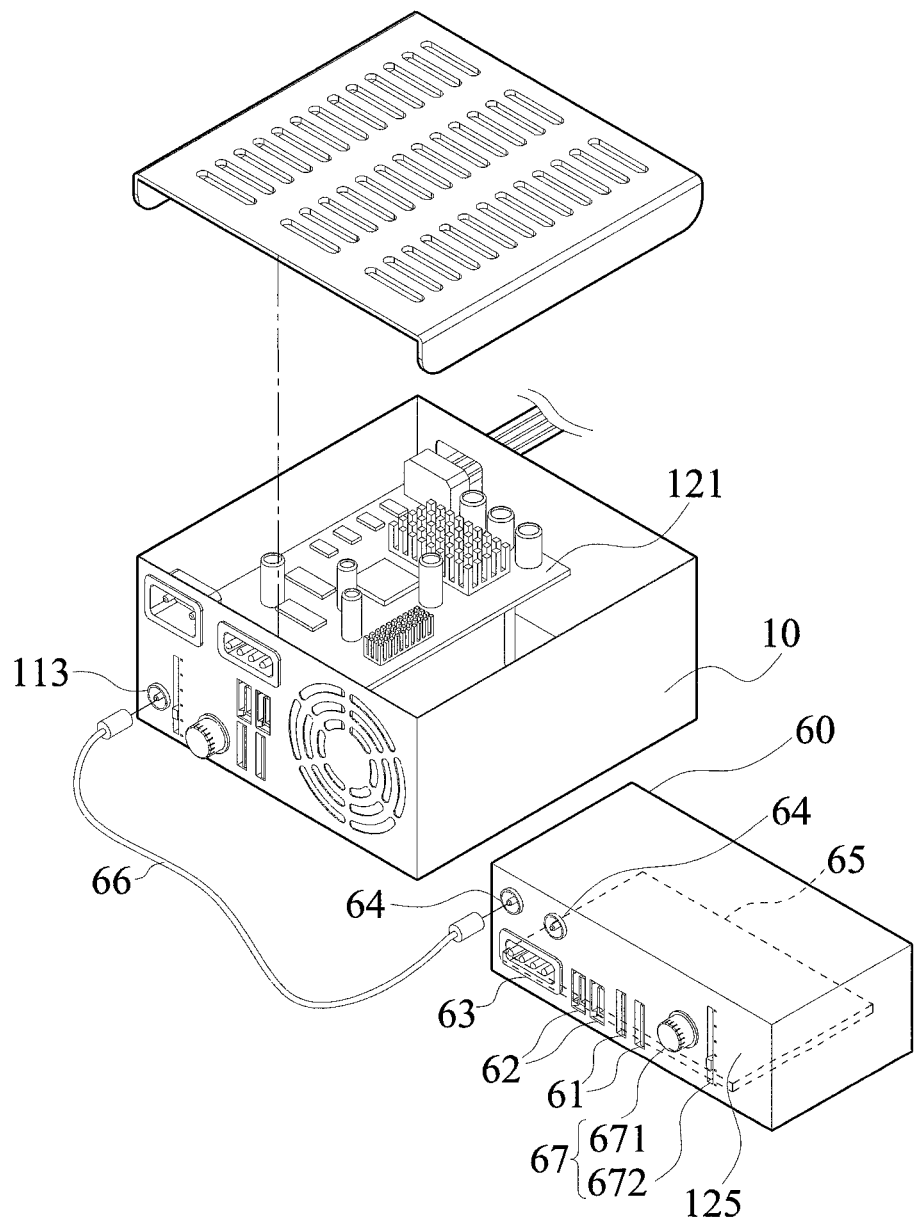
FIG. 4 is a schematic perspective view of a second preferred embodiment of the present invention.
Figure 5:
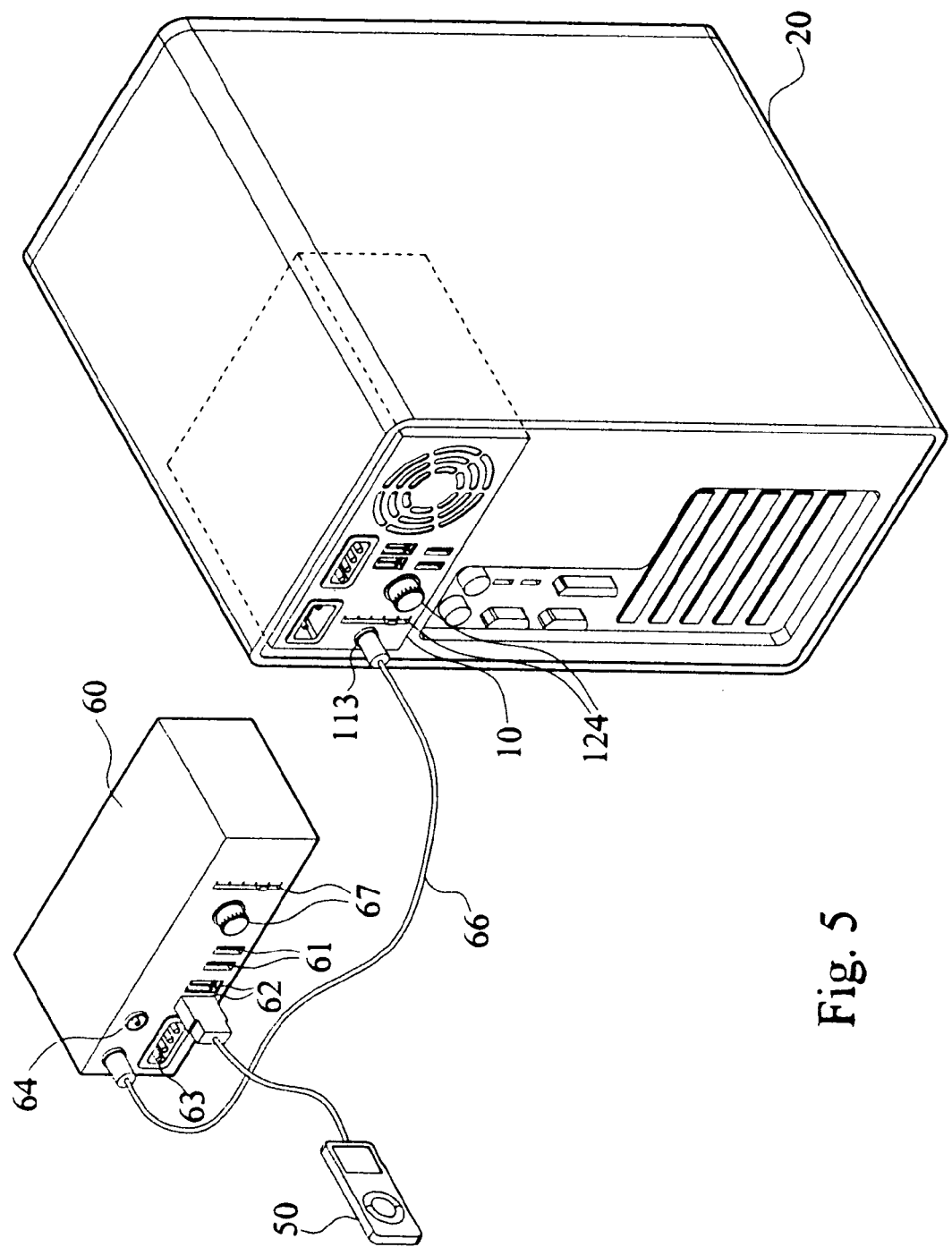
FIG. 5 is a schematic view of an application status in accordance with a second preferred embodiment of the present invention.

With reference to FIGS. 4 and 5 for a perspective schematic views and a schematic view of an application status in accordance with a second preferred embodiment of the present invention respectively, the composite power supply 10 of the second preferred embodiment is substantially the same as the first preferred embodiment, except that the composite power supply 10 is electrically connected to an expansion box 60 by an external cable. In the figures, the expansion box 60 of this embodiment is a rectangular cuboid structure, whose surface has a pair of USB ports 61, a pair of SATA ports 62, an ATA port 63, a pair of DC ports 64, and a control circuit board 65 installed in the expansion box 60, wherein the USB ports 61, SATA ports 62, ATA port 63 and DC ports 64 are separately and electrically connected to the control circuit board 65, and then the DC port 113 of the composite power supply 10 is electrically connected to the DC port 64 of the expansion box 60 an electric power line 66, such that the control circuit board 65 is electrically connected to the power supply circuit 121. To facilitate users to adjust the output voltage value of the DC port 64, the expansion box 60 has an adjusting structure 67 on a surface of the expansion box 60, and the adjusting structure 67 is selectively a knob 671 or a multi-stage switch 672, provided for adjusting a desired voltage value quickly by rotating the knob or flip the switch. It is noteworthy to point out that after the expansion box 60 and the composite power supply 10 are electrically connected to each other, the adjusting structure 124 disposed on the surface of the composite power supply 10 will be disabled automatically, such that the voltage value of the DC port 113 cannot be adjusted.

In FIG. 5, the expansion box 60 can be installed freely at any position outside the composite power supply 10, such that users can access and use the electric power from the USB ports 61, the SATA ports 62, the ATA ports 63 or the DC ports 64 through an electric power line 66 with a sufficient length, and adjust the output voltage of the DC port 64 through the adjusting structure 67, so as to improve the convenience and the application and operation significantly.

Third Preferred Embodiment

Figure 6:
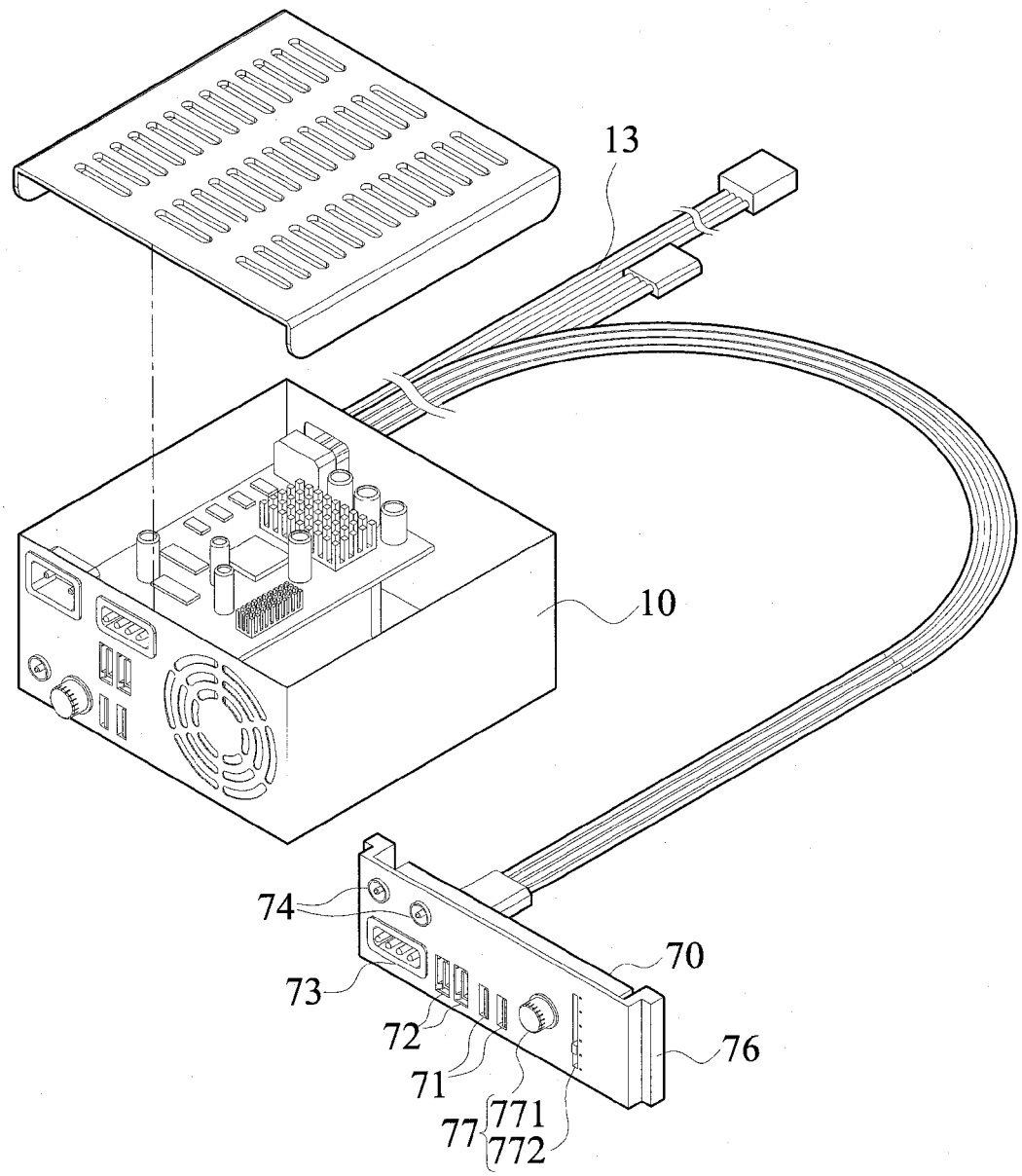
FIG. 6 is a schematic perspective view of a third preferred embodiment of the present invention.

With reference to FIGS. 6 and 7 for a perspective schematic view and a schematic view of an application status in accordance with a third preferred embodiment of the present invention respectively, the composite power supply 10 of the third preferred embodiment is substantially the same as the second preferred embodiment, except the exterior of the composite power supply 10 is internally connected to an expansion panel 70 by one of the power cluster lines 13 to complete the electric connection. The width of the expansion panel 70 is preferably equal to 5.5 inches to accommodate the 5.5-inch expansion slot of a desktop computer. A pair of USB ports 71, a pair of SATA ports 72, a ATA port 73, a pair of DC ports 74 and a control circuit board 75 are installed on a surface of the expansion panel 70, and a latch portion 76 is disposed separately on both lateral sides of the expansion panel 70 and latched at an installation slot (not shown in the figure), and the pair of USB ports 71, the pair of SATA ports 72, the ATA port 73 and the pair of DC ports 74 are separately and electrically connected to the control circuit board 75, and the control circuit board 75 is electrically connected to the power supply circuit 121 through the power cluster line 13. To facilitate users to adjust the output voltage value of the DC port 64, the expansion panel 70 has an adjusting structure 77 on a surface of the expansion panel 70, and the adjusting structure 77 is selectively a knob 771 or a multi-stage switch 772, provided for adjusting a desired voltage value quickly by rotating the knob or flip the switch. Similar to the second preferred embodiment, after the expansion box 70 is electrically connected to the composite power supply 10, the adjusting structure 124 installed on the surface of the composite power supply 10 will be disabled automatically, so that the voltage value of the DC port 113 cannot be adjusted.

Therefore, the expansion panel 70 and the composite power supply 10 are electrically connected through the internal power cluster line 13, and the expansion panel 70 is combined with a front panel of a computer system to facilitate supplying power or charging various portable electronic products 50 through various electric ports on the expansion panel 70, and the adjusting structure 77 can be used for adjusting the output voltage. The invention can improve the convenience of the application and adjustment.

Obviously, the invention can improve over the prior art and comply with the patent application requirements, and thus is duly filed for patent application.

While the invention has been described by device of specific embodiments, numerous modifications and variations such as the type, shape, and size of the casing or the type of the multi-stage switch and knob could be made thereto by those generally skilled in the art without departing from the scope and spirit of the invention set forth in the claims.

What is claimed is:

1. A composite power supply, comprising:
   a casing, having an electric socket, at least one DC port and at least one through hole, and the electric socket being provided for electrically coupling an external electric power source;
   a circuit board, installed in the casing, and having a power supply circuit, a plug-and-play circuit and a DC-DC conversion circuit, and the power supply circuit being electrically coupled to the electric socket, the plug-and-play circuit and the DC-DC conversion circuit, and the DC-DC conversion circuit being electrically coupled to the DC port, and the DC-DC conversion circuit having an adjusting structure for adjusting an output voltage of the DC port;
   at least one power cluster line, installed on the circuit board, electrically coupled to the power supply circuit, and passed out of a through hole of the casing; and
   an external expansion box, and at least one USB port, at least one SATA port, at least one DC port installed on a surface of the external expansion box, and a control circuit board, and the USB port, the SATA port and the DC port being separately and electrically coupled to the control circuit board, such that the control circuit board is electrically coupled to the power supply circuit;
   wherein the DC port of the expansion box is electrically coupled to the DC port of the power supply circuit by an electric power line.

* * * * *